ULTRA HIGH FREQUENCY SIGNAL GENERATOR

Filed April 23, 1945 4 Sheets-Sheet 1

Inventors
Andrew V. Haeff
Thure E. Hanley
Charles B. Smith
By Ralph L. Chappell
Attorney Dec. 26, 1950 A. V. HAEFF ET AL 2,535,062

ULTRA HIGH FREQUENCY SIGNAL GENERATOR

Filed April 28, 1945 4 Sheets-Sheet 2

Inventors
Andrew V. Haeff
Thure E. Hanley
Charles B. Smith
By Ralph L. Chappell
Attorney Dec. 26, 1950 A. V. HAEFF ET AL 2,535,062

ULTRA HIGH FREQUENCY SIGNAL GENERATOR

Filed April 28, 1945 4 Sheets-Sheet 3

Inventors
Andrew V. Haeff
Thure E. Hanley
Charles B. Smith

By Ralph L. Chappell
Attorney

ULTRA HIGH FREQUENCY SIGNAL GENERATOR

Filed April 28, 1945 4 Sheets-Sheet 4

Inventors
Andrew V. Haeff
Thure E. Hanley
Charles B. Smith
By Ralph L. Chappell
Attorney

UNITED STATES PATENT OFFICE 2,535,062

ULTRA HIGH FREQUENCY SIGNAL GENERATOR

Andrew V. Haeff and Thure E. Hanley, Washington, D. C., and Charles B. Smith, Silver Spring, Md.

Application April 28, 1945, Serial No. 590,854

14 Claims. (Cl. 250—36)

(Granted under the act of March 3, 1883, as amended April 30, 1928; 370 O. G. 757)

This invention relates broadly to improvements in signal generators and more particularly to an ultra high frequency signal generator adapted for unmodulated, modulated or pulsed operation.

Due to the wide application of the pulse technique in the ultra high frequency field, there has been a definite need for reliable ultra high frequency signal generators capable of producing short pulses of radio frequency energy of known amplitude and duration and tunable over a wide range of frequencies in the microwave band. One important use of such a signal generator is, for example, in aligning, testing, and measuring the overall sensitivity and performance of ultra high frequency receivers and other high frequency electronic devices requiring a source of accurate, adjustable calibrated radio frequency voltage, unmodulated, modulated or pulsed. Many other uses of such a signal generator are readily recognizable. Attempts to adapt for pulse operation known types of commercially available standard signal generators have not been entirely successful since they have been found too unreliable and lacking in the desired output characteristics in the very high frequency ranges and above.

One of the objects of the present invention is to provide an improved signal generator for use at ultra high frequencies and higher frequency ranges.

Another object of the invention is to provide a signal generator capable of unmodulated, modulated or pulsed operation at ultra high frequencies.

A further object of the invention is to provide a simple and efficient signal generator for use at ultra high frequencies in the range substantially between 500 and 4000 megacycles.

A still further object of the invention is the provision within an ultra high frequency signal generator of a complete oscillation generation system capable of delivering a continuous radio frequency output which is either unmodulated, modulated or pulsed, of known amplitude and duration, in combination with a wavemeter for insuring the adjustment of the oscillator frequency, an attenuator for accurately controlling the amplitude of the signal generator output, and a radio frequency shielding and filtering system for minimizing leakage radiation from the ultra high frequency energy generator.

A feature of the present invention is the internal pulser circuit arrangement which is built into the signal generator system.

Another feature of the invention is the use of a special radio frequency filter system in the signal generator circuit.

Other objects, features and advantages of the invention will be apparent from the following detailed description considered in connection with the accompanying drawings which disclose several embodiments of the invention. It is expressly understood however that the drawings are designed for purposes of illustration only and not as a definition of the limits of the invention, reference for the latter purpose being had to the appended claims.

In the drawings, wherein similar reference characters denote similar elements throughout the several views.

In its broad aspects the present invention provides signal generators composed of the following elements: A variable-frequency cavity oscillator, a pulser, a power-supply, and a power-level monitor. The oscillator is of the grounded-grid type tunable over a band of frequencies having a pair of tunable circuits consisting of two concentric cylindrical resonant cavities, one in the grid-plate circuit and the other in the grid-cathode circuit. Means are included for feed-back coupling between the two cavities. A tunable attenuator is inductively coupled to the cathode cavity. Measurement of the power output of the oscillator is accomplished by the power-level monitor and determined by the setting of the attenuator and by the reading of an output meter in a balanced bridge circuit including a bolometer element associated with the power-level monitor system. A cavity-type wavemeter is associated with the oscillator and includes a rectifier, a tunable quarter wave coaxial line section loosely coupled to the plate cavity of the oscillator, and a reference meter in the rectified output of the wavemeter circuit for indicating resonance of the wavemeter with said oscillator. For pulsed operation of the oscillator an internal pulser system is provided comprising a vacuum tube asymmetrical multivibrator circuit, a pulser tube connected to the multivibrator circuit and keyed by the output thereof, an open-ended artificial transmission line in the cathode circuit of the pulser tube, and a keyer tube controlled by the output of said pulser tube. Means are provided whereby the cathode of the oscillator may be selectively connected to synchronizing or triggering signals supplied from either the output of the internal pulser system or from pulses supplied from an independent, external pulse source. Means are included also for effecting either unmodulated or continuous wave operation of said oscillator. Radiation or leakage of the high frequency energy is minimized by the provision of a special filter system and radio frequency shielding whereby a calibrated output voltage is obtained from the signal generator throughout its entire frequency band. Ventilation is provided by an electric fan within the signal generator cabinet.

Figure 1:
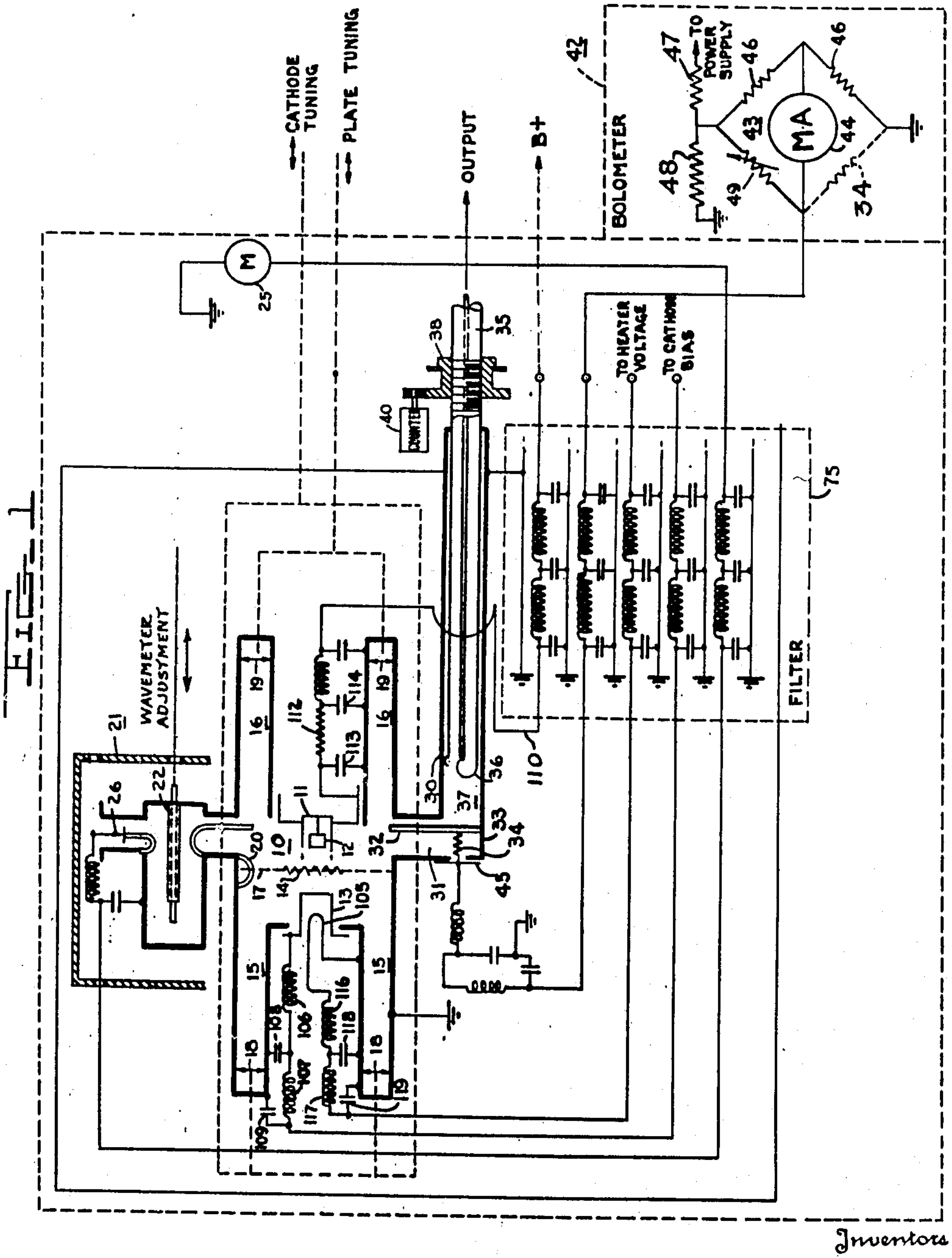
Fig. 1 is a diagrammatic illustration partly in section of a signal generator constructed in accordance with one embodiment of the present invention.

Referring now to Fig. 1, the radio frequency cavity oscillator 10 there shown is of the grounded grid type using a "lighthouse" tube 11 (type 446A triode) which comprises a disk-seal, parallel-plane design triode of the family now commonly referred to in the art by the generic term "megatrons." The essential elements of the oscillator circuit are shown schematically in Fig. 1 wherein there is illustrated the relative arrangements of the various capacitances, inductances and other elements within the associated resonant cavities or tank circuits. For the purposes of discussion the elements of the "lighthouse" oscillator tube 11 are illustrated schematically as consisting of an anode or plate 12, a cathode 13 and a grid or control electrode 14. The oscillatory circuit consists of cathode and plate resonant cavities 15 and 16 respectively, which are separated by a transverse partition 17 in the plane of the grid 14.

The radio frequency cathode 13 of the tube 11 is insulated inside the tube from the direct current cathode or heater 105 by a mica washer (not shown). The cathode 13 is provided with a filter including inductances 106—107 and capacitors 108—109, and the heater 105 is supplied with a suitable voltage through a filter including inductances 116—117 and capacitors 118 and 119. Plate voltage is supplied by way of lead 110 through a filter comprising resistor 112 and capacitors 113 and 114.

The cavities 15 and 16 are independently tunable by means of the sliding spring contacts or plungers 18 and 19—one in the plate-grid cavity and one in the grid-cathode cavity. The frequency of oscillation is determined by tuning the grid-plate and grid-cathode cavities, the frequency range being controlled by adjustment of the plungers 18 and 19 which are ganged together and slide in their respective cavities upon rotation of a lead screw (not shown) by means of separate frequency-control knobs (not shown) on the front panel of the signal generator cabinet. If desired, suitable counters (not shown) may be provided operatively connected to the plate and cathode tuning control knobs for separately indicating the position of the sliding plungers 18 and 19 within the cavities. With such an arrangement, the revolutions of the frequency knob are counted on the revolution counter, appearing in tenths of a revolution from 0 to 100, and a frequency calibration chart is provided for each individual equipment which enables the desired frequency to be obtained by turning the frequency knob until the proper counter reading appears.

Oscillations are maintained by a fixed coupling lead 20 which provides feedback between the cavities 15 and 16.

The output of the oscillator 10 is taken from the plate grid cavity 16 by means of a stub 32 which operates as the primary of a mutual-inductance attenuator 30, which is to be described subsequently in greater detail, the secondary of which is the small loop 36 of the output attenuator system.

For an accurate adjustment of oscillator frequency a wavemeter 21 is provided which is built into the signal generator system as an integral part thereof. This wavemeter is designed to cover a frequency range from 500 mc. to 4000 mc. The wavemeter 21 consists of an accurately tunable quarterwave coaxial line section 22 which is loosely coupled to the plate-grid cavity 16. The resonance of the wavemeter circuit may be indicated by a reference meter 25 suitably located on the front panel (not shown) of the signal generator. The meter 25 reads rectified current output of a crystal 26 coupled to the wavemeter circuit. The wavemeter frequency can be read from a wavemeter frequency calibration table and curve (not shown) for the particular dial scale and meter settings indicated. High Q of the wavemeter circuit and a large reading on the meter permit the setting of frequency with a relative accuracy of the order of 0.1 mc.

The output attenuator system consists of a cylindrical waveguide type attenuator 30, of 0.5" diameter tubing. The total range of attenuation is over 180 db., so that a range of voltage output from a maximum of 0.15 volt to a small fraction of a microvolt is available. As illustrated, the attenuator input circuit consists of a coaxial line 31 having a stub 32 which is capacitatively coupled at the open end thereof to the oscillator circuit, and is shorted at the end 33 to which the attenuator is constantly monitored by means of a bolometer wire 34 mounted near the shorted end of the coaxial line 31.

The output of the oscillator after attenuation is available by means of coaxial output cable 35 which consists of a "lossy" cable coupled by means of a small loop 36 to the attenuator chamber 37, the loop 36 being connected to ground through a moving contactor inside the attenuator tube. The cable 35, which is a concentric semi-flexible cable approximately four feet in length, is attached to the attenuator by a suitable radio frequency coupling and brought outside of the signal generator cabinet through the center of the single calibrated attenuator control knob 38. Due to high attenuation of the cable 35 (over 10 db.) the effective internal impedance of the signal generator as it appears from the output terminal (cable connector 35) is substantially constant over the entire frequency range of the signal generator and is equal to the characteristic impedance of the output cable 35, which may be either 50 ohms or 70 ohms depending upon the design of the signal generator.

The length of the "lossy" cable is usually determined by its attenuation at the lowest frequency which should be of the order of 6 to 10 db. In a signal generator covering very high frequency range this may result in loss in output voltage due to the excessive loss in the "lossy" cable at the high frequency end of the range. This is caused by increased attenuation of the cable at higher frequencies.

In order to obtain proper internal impedance of the signal generator over a wide frequency range without excessive loss in power output at high frequencies the "lossy" line may be used in combination with the usual terminating resistors. Then, at low frequency the termination of the proper character is due to the presence of the resistor at the pick-up loop 36 of the output cable even though the attenuation of the "lossy" cable is insufficient. At higher frequency, even though the terminating resistor has appreciable reactive impedance, the increased loss of the cable makes the effective impedance of the signal generator approach the character of pure resistance equal to the characteristic impedance of the output cable.

The attenuation is controlled by a known form of index nut and screw-threaded slide arrangement driven by gearing connected to the attenuator control knob 38. Turning the attenuator knob 38 moves the output coupling loop 36 and varies the coupling within the attenuator chamber 37 and therefore the output voltage. The position of the attenuator is indicated by graduations on the attenuator knob 38 and by the counter 40. The threads per inch of the attenuator movement and the counter gearing are such that the counter 40 reads approximately in decibels below a specified level. The counter 40 has reading ranges from 0 to 100 db. in tenths of a decibel, changing 2 db. per revolution of the attenuator knob. The reading can be converted to output voltage by using a calibration chart provided with the equipment.

The attenuator can be set within 0.1 db. or better and it is so designed as to have straight-line attenuation and is direct reading in decibels. Because of the loading which is caused by the attenuator stub it is impossible to track the plungers 18 and 19 over the range of frequencies covered by the signal generator. As will appear more fully hereinafter, a compensating impedance loop may be connected between the plate and grid cylinders of the oscillator to make tracking possible. This loop loads the plate-grid cavity and tracking can be accomplished only when the impedance of loop and the impedance of the attenuator stub 32 are equal over the whole frequency band.

In order to have a continuous indication of the oscillator power a precision bolometer-type monitor device generally designated 42 is provided. It consists of a short length of Wollaston wire 34 (taken from 0.01 ampere Little-fuse) which is connected between the inner conductor or stub 32 of the attenuator input coaxial line 31 and ground through a suitable by-pass capacitor 45. The wire 34 forms one branch of a balanced Wheatstone bridge 43 connected to a suitable indicating meter 44 (microammeter) on the front panel of the device to indicate the degree of unbalance of the bridge. As above-mentioned, the bolometer element 34 is connected through capacitor 45 across the radio frequency oscillator circuit near the input to the attenuator system. The second (broken line) representation of resistor 34 shows its relative position in the bridge circuit 43. The other two branches of the bridge 43 contain resistors 46—46 each of equal resistive value. Resistors 47 and 48 are voltage dividers which provide the desired voltage drop across the bridge. A small D.-C. current supplied from a conventional type of regulated power supply passes through the bridge continuously. The bridge 43 is balanced for the condition of zero radio frequency power by means of an adjustable variable resistor 49 mounted on the front panel and used to adjust the meter 44 to zero before the oscillator 10 is turned on. When the oscillator is turned on, radio frequency power flows through the Wollaston wire 34, the heating of which by the radio frequency currents changes its resistance thereby unbalancing the bridge 43, and giving an indicating deflection on the meter 44 which is approximately proportional to the radio frequency power.

The power at the output cable 35 of the signal generator is calibrated by means of the precision bolometer 42 matched to the output cable—for a specified indication (normally mid-position) on the output meter 44. When the oscillator plate voltage is manually adjusted to give the standard indication on the output meter 44, the available voltage at the output terminal can be read directly from suitable attenuator calibration curves (not shown). Due to the use of (*a*) a non-resonant bolometer 42 for monitoring the input to the attenuator 30; (*b*) small diameter of the attenuator 30 having low frequency correction; and (*c*) the "lossy" cable 35 for determining internal impedance of the signal generator, the voltage output of the signal generator for standard setting of the monitor 42 and a given setting of the attenuator 30 varies but little with frequency.

Figure 2:
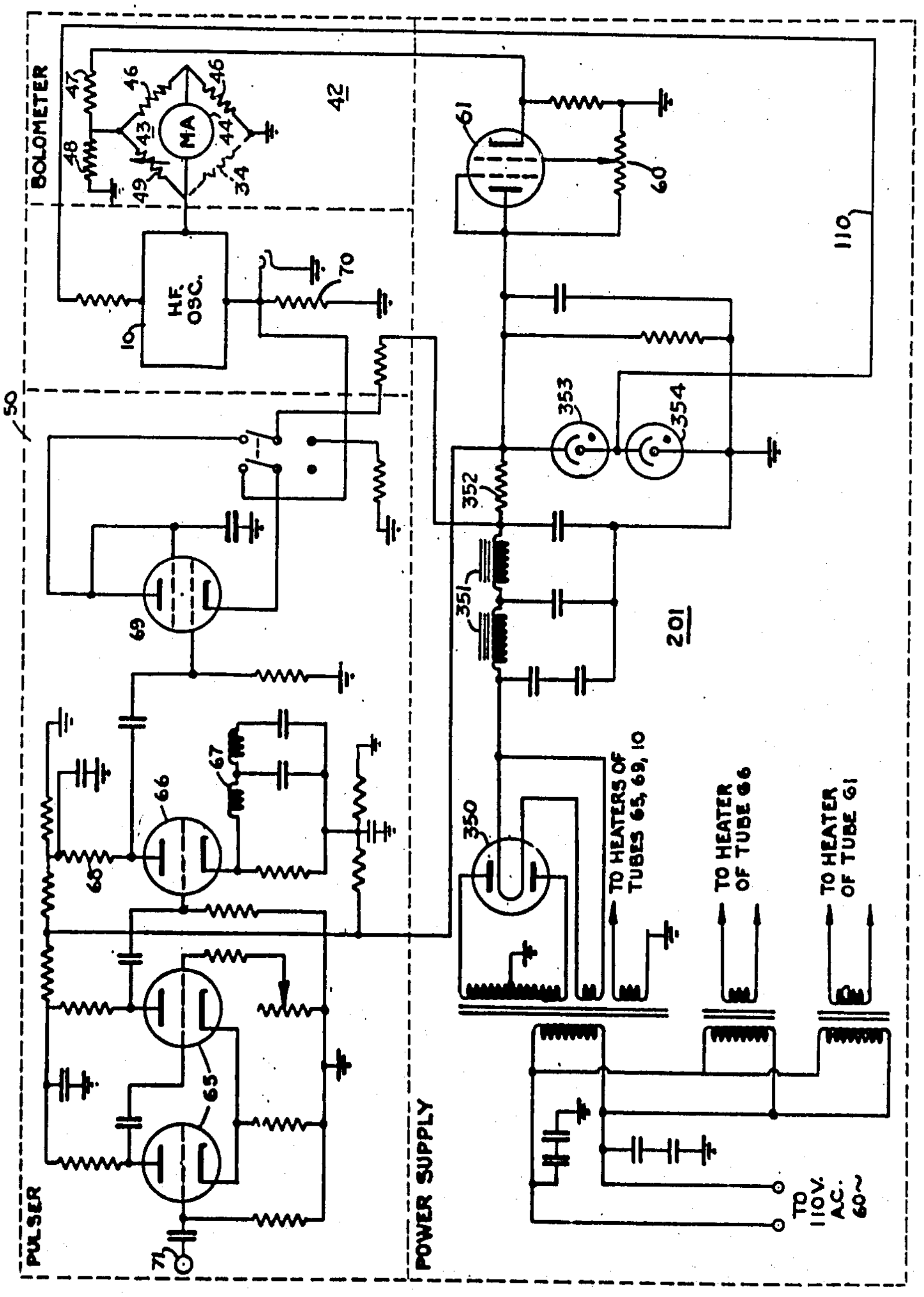
Fig. 2 is a diagrammatic illustration of a signal generator of the present invention showing the pulser circuit and power supply thereof in greater detail.

In Fig. 2 of the drawings the oscillator 10 and bolometer 42 of the Fig. 1 signal generator are shown in connection with a pulser 50 and a power supply circuit 201. The power supply circuit 201 is of the voltage-regulated power supply type employing a full-wave high vacuum rectifier tube 350 and an LC filter 351 of the condenser-input type. The output of the filter 351 passes through a dropping resistor 352 to two voltage regulator tubes 353 and 354 connected in series. The lead 110 is connected between the voltage regulator tubes 353 and 354 to provide the plate voltage for the oscillator 10. A voltage regulator tube 61, connected to function as a cathode follower, supplies the direct current for the bridge circuit 43 in accordance with adjustments of a potentiometer 60.

The signal generator is designed to give either continuous unmodulated or modulated continuous wave or pulsed output of known amplitude and duration. The continuous wave output is calibrated by means of an external bolometer (not shown). The pulser 50 is designed so that potentials of all electrodes of the oscillator tube 10 during operation to produce pulses assume values identical with those obtained during C. W. operation. Thus, the power output during the pulse is the same as for (C. W.) condition. This is checked by observing the amplitude of the radio frequency pulse on the cathode ray tube of the receiver being tested. The fact that the amplitude of the radio frequency pulse does not change with pulse length is a direct indication that even the shortest pulse of the radio frequency amplitude reaches its steady continuous wave value.

The function of the pulser 50 is to bias the cathode 13 of the tube 11 of the oscillator 10 so that the tube is cut off during the period between pulses, and to let the cathode 13 assume its normal bias for the duration of the pulse. This system of pulsing has the advantage that short rectangular pulses, of the order of one microsecond, can be easily obtained. The only requirement on the pulser is the ability to generate short pulses with "steep" sides. Variations of pulse amplitude and irregularities of the pulse near the top have no effect on the envelope of the final radio frequency pulse. The length of the pulse is controlled solely by the constants of an artificial transmission line 67, presently to be described, and thus is also independent of variation in pulser tube characteristics or other factors.

The pulser produces pulses adjustable between 2 and 30 microseconds duration at a pulse repetition rate variable from 60 to 2500 pulses per second. Provision is made for applying external synchronizing voltage in which case the pulse repetition rate can be extended to 4000 pulses per second. The pulse delay circuit allows delaying the final pulse relative to the external synchronizing pulse by an interval of from 3 to 300 microseconds.

In particular, the pulser 50 comprises a 6SN7 tube 65 in an asymmetrical multivibrator circuit, the output of which keys an 834 tube 66. The open-circuited artificial transmission line 67 is included in the cathode circuit of the tube 66 and controls the length of time during which the tube 66 conducts. The negative pulse voltage produced across plate resistor 68 of tube 66 is applied to the grid of a 6Y6 tube 69, so that the current which normally passes through the tube 69 is cut off during the pulse. The normal current of the tube 69 flows through a resistor 70 (270 ohms) common to the cathodes of the tube 69 and the oscillator tube 11 and is sufficient to cut off the current in the oscillator 10. By interrupting current in the tube 69 the negative pulse restores normal operating bias on the oscillator 10 for the duration of the pulse. An external triggering signal from a suitable source can be supplied at a terminal 71 to synchronize and stabilize the multivibrator 65. The synchronizing input can be sinusoidal or other wave shape.

Figure 5:
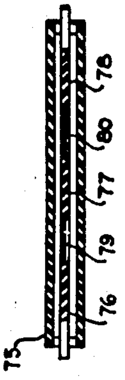
Fig. 5 is a longitudinal sectional view through line 5—5 of Fig. 4.
Figure 4:
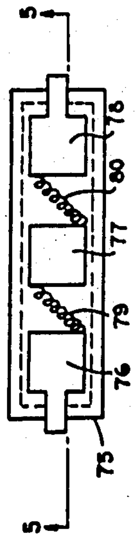
Fig. 4 is a plan view of the special radio frequency filter arrangement employed in the present invention.

Considerable attention in the design of this signal generator has been given to radio frequency shielding and filtering in order to minimize leakage and radiation from the generator at the very high frequencies generated. The oscillator circuit, the wavemeter circuit, and the attenuator input circuit are all of cavity type so that radio frequency fields are confined within separate and associated metal enclosures. All leads carrying direct current or pulse currents pass through radio frequency filters built within this primary shielding. The complete oscillator-attenuator-wavemeter assembly is placed inside a metal housing or compartment (not shown) so constructed and arranged as to constitute a second shield. As shown in Fig. 1 all leads from this compartment are brought out through a specially designed filter circuit 75. The filter circuit 75 is constructed in accordance with the principles disclosed in the application of Andrew V. Haeff, Serial No. 635,121, filed November 29, 1945, for Radio Frequency Filter. The filter 75 consists of six isolated compartments (not shown) for the six separate leads thereof. Each compartment houses a filter unit of the construction shown in Figs. 4 and 5 formed of a two-section constant-K type filter assembly made up of three capacitors 76, 77, and 78 connected by two chokes 79 and 80 each of No. 34 wire, one-eighth inch diameter and two centimeters long.

Five of these filter units have a capacitance of 200 mmfd., while the sixth, through which the pulse is applied to the cathode of the oscillator, has a total capacitance of the order of 75 mmfd. in order to pass narrow pulses.

As previously mentioned, one of the important uses of this pulses signal generator is in connection with the alignment, testing, and measurement of overall sensitivity of ultra-high frequency receivers such as, for example, of the type employed in radio-echo object detecting and ranging equipment, and in the measurement of gain, noise factor, response to pulse, overload, and other characteristics of the receiver. For the measurement of sensitivity, for example, a pulse signal is fed to the rceiver to be tested, and observations are made on the cathode ray tube normally associated with the indicator unit used with such equipment. The pulse voltage corresponding to the minimum signal discernible on the cathode ray indicator tube is taken as a measure the overall signal-to-noise ratio of the receiver. In making these measurements on complete receiver-indicator units of radio-echo object locating equipment, it is convenient to have the signal generator pulser triggered by the pulse which is used for triggering the indicator unit and, also, to delay the artificial echo pulse by an adjustable amount in order to observe the pulse at a convenient position on the screen of the cathode ray indicator tube.

Figure 3:
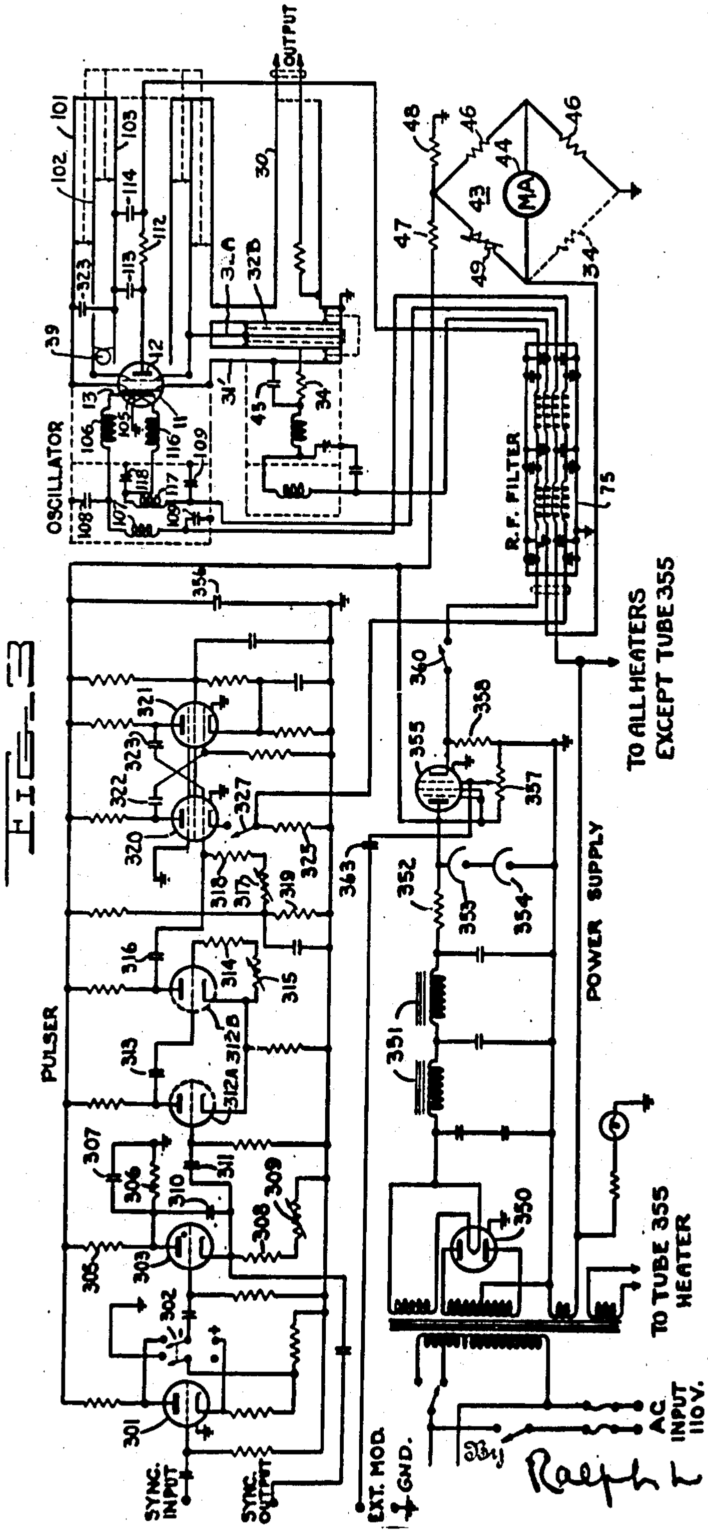
Fig. 3 is a diagrammatic showing of a signal generator constructed in accordance with another embodiment of the present invention.

The pulser, which is to be presently described, has been designed to fulfill these requirements, and it has been incorporated in the signal generator circuit of Fig. 3.

Referring to the pulser circuit shown in Fig. 3 tube 301, a type 6J5 triode, is used only when it is desirable to synchronize the pulser from an external source. The switch 302 (D. P. D. T.) should be set at "plus" or "minus" position to agree with the polarity of the external synchronizing pulses to be used (waveform not critical). Thus, with negative external pulses and switch 302 set at "minus" position, positive pulses are delivered to the grid of tube 303 which is a type 884 gas-filled triode used as a relaxation oscillator. Resistors 305 and 306 constitute a voltage divider, and capacitor 307 (12 mfd.) holds the plate of tube 303 at constant voltage. When tube 303 fires, the sudden flow of current through resistors 308 and 309 causes a sharp rise of the cathode potential which cuts off the tube. The cathode voltage then starts to leak off to ground through resistors 308 and 309 and thus there is built up a potential difference across capacitor 310. This continues until the firing point is reached, when tube 303 again fires, discharging capacitor 310 and causing a sharp rise in cathode potential.

The charging rate of capacitor 310, and consequently the time required for each cycle, is variable by means of variable resistor 309, which is the pulse-rate control. Although the setting of resistor 309 governs the free-running rate of the oscillator (60 to 2500 cycles per second), it readily synchronizes with an external pulse rate within this range, applied through tube 301 to the grid of tube 303. An external pulse reduces the negative bias on the grid of tube 303 and causes the tube to fire without waiting for the cathode voltage to drop to the firing point necessary for free-running oscillation. Waveform A (Fig. 6) shows the shape of voltage pulse at the cathode of tube 303 with respect to ground.

Figure 6:
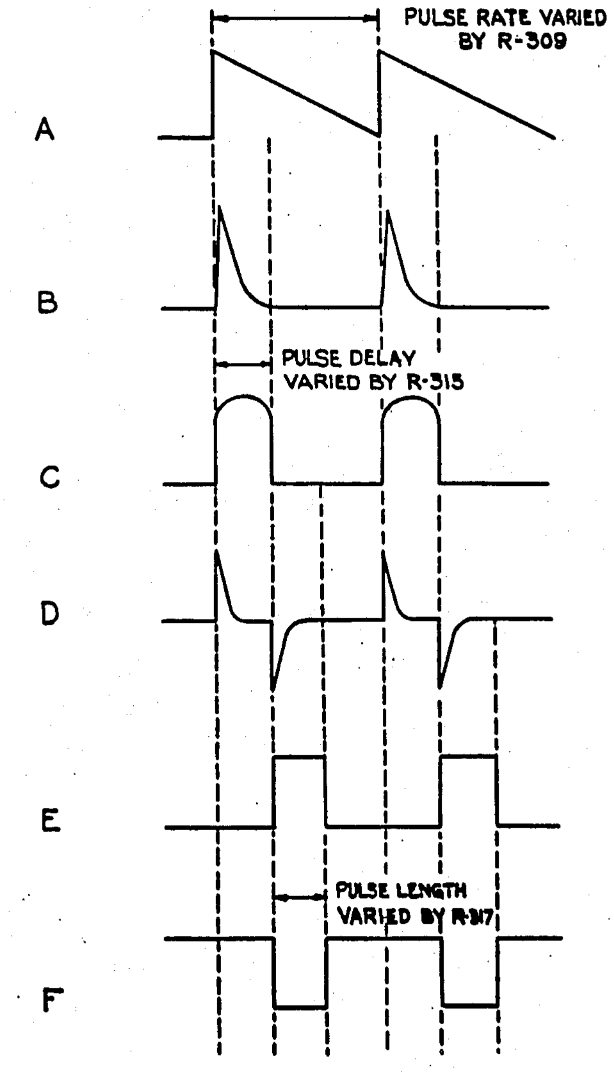
Fig. 6 is a group of waveforms of various voltages developed upon operation of the Fig. 3 embodiment.

The pulse at the cathode of tube 303 is applied through capacitor 311 to the grid of tube 312A, which is the first section of a type 6SN7 dual-section triode. Because of the low capacitance (200 mmfd.) of capacitor 311, it charges quickly and the pulse reaches the grid of tube 312A as a sharp positive pip (waveform B of Fig. 6). This positive pip starts plate current flowing in tube 312A which is normally biased below cutoff. The fall of plate potential resulting from this current is applied through capacitor 313 to the grid of tube 312 driving it to cutoff. The charge of capacitor 313 leaks off through resistor 314 and 315 and allows plate current to flow again in the second section (tube 312B) of the pulse delay multivibrator 312. Tube 312A in the meantime has quickly biased itself below cutoff again. During the time the plate current of tube 312B is cut-off there is a rise in plate voltage, and a positive voltage pulse of the form shown by waveform C, Fig. 6, is obtained. The length of this pulse is variable with the pulse-delay control (resistor 315).

A differentiating circuit is employed in the output of tube 312B consisting of capacitor 316 and resistor 317 with associated resistors 318 and 319 in the grid circuit of tube 320. The result is a sharp positive pip from the leading edge of the output pulse from tube 312B and a sharp negative pip from the trailing edge, which are applied to the grid of tube 320 (see waveform D, Fig. 6).

Tube 320 is a type 6AC7 tube used, in conjunction with tube 321, as a keyer-multivibrator and is normally conducting. The positive pip applied to its grid has little effect on the plate current of tube 320 because it is already high, but the negative pip cuts down the plate current and starts the action in the multivibrator circuit of which tube 320 is a part. Thus by varying the length of the pulse from tube 312B, the spacing between the positive and negative pips is varied. This spacing is the time delay between the start of a synchronizing pulse applied to tube 301 and the start of the output pulse.

The rise in plate potential, resulting when the plate current of tube 320 is cut down by the negative pip from tube 312B, is fed through capacitor 322 to the grid of tube 321 which is a type 6AC7 operated as a multivibrator in conjunction with tube 320. Tube 321 is normally cut off, and the positive pulse from tube 320 starts plate current flowing in tube 321. The plate potential drops and this drop is fed back to the grid of tube 320 through capacitor 323. This process is regenerative and continues until cutoff occurs in tube 320 and saturation current flows in tube 321. The charge on capacitor 323 then leaks off through resistor 317 and associated resistors 318 and 319 until tube 320 again conducts and tube 321 is cut off. Waveform E, Fig. 6, shows the pulse form at the plate of tube 320.

The pulse length which corresponds to the time tube 320 is cut off is adjustable by means of resistor 317, the pulse-length control.

The cathode resistor 325 of tube 320 is also the cathode resistor of the oscillator tube 11. With tube 320 conducting, its plate and screen currents cause sufficient drop across resistor 325 to cut off the radio frequency oscillator tube 11, the grid of which is grounded. When tube 320 is cut off this extra bias is removed and tube 11 oscillates. A switch 327 mounted on the pulse-rate control (resistor 309) is provided to disconnect the pulser circuit when continuous-wave (C. W.) operation is desired. Waveform F, Fig. 6, shows the pulse forms at the cathode of tube 320 with switch 327 closed. With no external synchronizing voltage applied to the pulser circuit the frequency can be varied from about 200 cycles per second to about 1500 cycles per second. With the external synchronization, the range is from about 100 cycles per second to about 2500 cycles per second.

The oscillator of Fig. 3 includes the tube 11 and cathode and plate cavities coupled thereto. The cavities are formed by three hollow cylinders or tubular members 101, 102 and 103 arranged concentrically one inside the other. The middle or grid cylinder 102 is provided with an electrical connector (not shown) having spring fingers arranged in a ring which make contact with the disk-like grid terminal of the "lighthouse" oscillator tube 11, and the outer or cathode cylinder 101 is provided with a similar ring connector (not shown) which makes similar contact with the cathode terminal band connected to the cathode 13 of tube 11. The cathode 13 of tube 11 is insulated inside of the tube from the heater 105 by a mica washer (not shown). The cathode 13 is connected to the resistor 325 through the filter 75, and plate voltage is applied to oscillator tube 11 by means of line 110 and a filter is provided in the circuit of the heater 105 in a manner similar to the Fig. 1 arrangement.

Oscillations are maintained by an adjustable coupling capacitor 323, in the form of a 4–42 screw, which provides feed-back coupling between the cathode and plate cavities. The screw 323 is supported in the cathode cylinder 101 and extends through a clearance hole in the grid cylinder 102. The capacitance of screw 323 is varied by varying the distance of its inner end from the inner or plate cylinder 103.

As mentioned heretofore, in order to make tracking possible a compensating impedance loop 39 is connected between the plate and grid cylinders 102 and 103 close to the tube 11. The loop loads the plate-grid cavity and tracking can be accomplished only when the impedance of the loop 39 and the impedance of the attenuator stub 32A—32B are equal over the whole frequency band.

In order to obtain uniform output of the signal generator over the desired frequency range the "stub" line 31' energizing the attenuator 30 is made in two sections 32A and 32B of different length having different characteristic impedances. For proper tracking the compensating impedance loop 39 is also made in two sections having lengths and impedances corresponding to those of the stub line 32A and 32B. In addition, undesirable second harmonic output is suppressed by loading the stub line either by properly positioning the bolometer element 34 and/or by adding special loading resistors along the stub line. The optimum position of the harmonic suppressing resistor is usually a distance approximately one electrical quarter wavelength (at the harmonic frequency) away from the shorted end of the stub line. This results in maximum loading of the stub line at the harmonic frequency while exhibiting only moderate loading effect at the fundamental frequency. This arrangement results in uniform power output over the frequency range and minimizes the amount of harmonic voltages appearing at the output terminal of the signal generator.

The power supply circuit for the Fig. 3 signal generator is similar to the power supply 201 described heretofore and includes the full wave rectifier tube 350, filter 351, dropping resistor 352 and voltage regulator tubes 353 and 354. Power for the pulser and the bridge circuit 43 are derived directly from the output of the voltage regulator tubes 353 and 354 and plate voltage for the oscillator 10 is supplied through voltage-controller tube 355.

Tube 355 is a type 6AC7 tube with screen and suppressor grids tied to the plate acting as a cathode follower. Varying the grid bias on the control grid, by means of potentiometer 357, changes the plate resistance of the tube and gives an adjustable voltage between cathode and ground, which is applied to the plate of oscillator tube 11. The foregoing arrangement insures that the plate voltage of the oscillator remains substantially constant under pulse or continuous wave operation and yet may be readily adjustable. Resistor 358 provides cathode bias for voltage-controlled tube 355. Switch 360 (S. P. S. T.) controls the application of plate voltage to oscillator tube 11 and makes it possible for all elements of tube 11 to heat up to operating temperature before plate voltage is applied thereto.

When external modulation of the signal generator output is desired, the modulating signal is applied between the "Ext. Mod." and "Gnd" terminals which are indicated at the extreme left of Fig. 3. This signal is carried through capacitor 363 to the control grid of voltage-controller tube 355, and thus modulates the plate-supply voltage and output of oscillator tube 11.

It should be distinctly understood that the specific arrangements of the circuit elements of Figs. 1, 2 and 3 are illustrative but not limitative of the present invention, and that the values of the circuit elements may vary and change when used for a specific range of ultra high frequencies. Thus, the signal generator shown in Figs. 1, 2 is designed primarily for use in the ultra high frequency range substantially between 2000 and 4000 megacycles while the sytsem illustrated in Fig. 3 is designed for use in the frequency range of from about 500 to 1300 megacycles, the principles of the invention being applicable to both embodiments shown.

Although several embodiments of the present invention have been disclosed and described in detail herein it is to be expressly understood that various changes and substitutions may be made therein without departing from the spirit of the invention as well understood with those skilled in the art. Reference, therefore, will be had to the appended claims for a definition of the limits of the invention.

The invention described herein may be manufactured and used by or for the Government of the United States of America for governmental purposes without the payment of any royalties thereon or therefor.

What is claimed is:

1. In combination, an oscillator of radio frequency oscillations including a vacuum tube having anode, cathode and control electrodes, and an oscillatory circuit comprising a pair of independently tunable resonant cavities; an adjustable attenuator system; means coupling said attenuator system to one of said cavities; said coupling means including means providing a transfer of energy from said one of said cavities to said attenuator system at a point of low voltage; and a bolometer element capacitively connected across the R. F. oscillation circuit near the input to said attenuator system, said bolometer element being connected to and forming one arm of a four-arm balanced bridge circuit.

2. A system in accordance with claim 1 characterized in this that filtering means are included in anode electrode circuit of said oscillator, the cathode electrode circuit of said oscillator and the bolometer input line to the bridge circuit.

3. A system in accordance with claim 1 characterized in this that filtering means are included in the anode electrode circuit of said oscillator, the cathode electrode circuit of said oscillator, and the bolometer input line to the bridge circuit, said filtering means in the separate leads each comprising a two-section low-pass constant-K type filter assembly.

4. A signal generator comprising a radio frequency vacuum tube oscillator tunable over a band of frequencies, said oscillator having a pair of tuned circuits for determining the frequency of the signals generated by said oscillator, said circuits comprising two independently tunable resonant cavities; means providing feedback between said cavities; a tunable attenuator system; means coupling said attenuator system to one of said cavities; said coupling means including means providing a transfer of energy from said one of said cavities to said attenuator system at a point of low voltage; a cavity-type wavemeter loosely coupled to the other of said cavities, said wavemeter including a rectifier and an indicating device in the rectified output of the wavemeter circuit for indicating resonance thereof; a bolometer element capacitively connected across the R. F. oscillator circuit near the input to said attenuator system, said bolometer element being connected to and forming one arm or branch of a Wheatstone bridge circuit the remaining three branches of which contain ohmic resistances, said bridge including an indicating meter; and means for supplying triggering signals to said oscillator from a source of pulse signals.

5. A signal generator comprising a radio-frequency vacuum tube oscillator circuit of the grounded-grid type tunable over a band of frequencies, said oscillator having a pair of tuned circuits for determining the frequency of the signals generated by said oscillator, said circuits comprising two independently tunable resonant cavities; means providing feedback between the two resonant cavities; a tunable attenuator; means coupling said attenuator system to one of said cavities; said coupling means including means providing a transfer of energy from said one of said cavities to said attenuator system at a point of low voltage; a cavity-type wavemeter loosely coupled to the other of said resonant cavities, said wavemeter including a rectifier and a meter in the rectified output of the wavemeter circuit for indicating resonance thereof; a bolometer element capacitively connected across the R. F. oscillator circuit near the input to said attenuator system, said bolometer element being connected to and forming one arm or branch of a Wheatstone bridge circuit the remaining three branches of which contain ohmic resistance, said bridge including an indicating meter; and a pulser system comprising a vacuum tube asymmetrical multivibrator circuit, a pulser tube having an anode, a cathode, and a control grid, said pulser tube being keyed by the output of said multivibrator, an artificial transmission line in the cathode circuit of said pulser tube, and a keyer tube.

6. A signal generator in accordance with claim 5, including filter circuit elements connected to the anode electrode circuit of said oscillator, the heater circuit of said oscillator, the cathode electrode circuit of said oscillator, the bolometer input line to the bridge circuit, and the line connecting the rectified output of said wavemeter to the indicating meter therein.

7. A signal generator comprising a radio-frequency oscillator system of the grounded-grid type tunable over a band of frequencies and including a high frequency vacuum tube having cathode, anode and control electrodes, said oscillator system having a pair of tuned circuits for determining the frequency of the signals generated by said oscillator, said circuits comprising two resonant cavities, one in the grid-plate circuit and the other in the grid-cathode circuit of said oscillator; means for independently tuning said cavities; means providing feedback between the two cavities, a wave-guide type attenuator system; means coupling said attenuator system to the cathode cavity of said oscillator; said coupling means including means providing a transfer of energy from said one of said cavities to said attenuator system at a point of low voltage; a cavity-type wavemeter including a rectifier, a tunable quarter-wave coaxial line section loosely coupled to the plate cavity of said oscillator, and a meter in the rectified output of the wavemeter circuit for indicating resonance of the wavemeter; a bolometer element capacitively connected across the R. F. oscillator circuit near the input to said attenuator system, said bolometer element being connected to and forming one arm or branch of a Wheatstone bridge circuit the remaining three branches of which contain ohmic resistances, said bridge including an indicating meter; and a pulser system comprising a phase inverter circuit a relaxation oscillator circuit, a pulse-delay multivibrator circuit, and keyer-multivibrator circuit in the form of a vacuum tube asymmetrical multivibrator the output of which keys said oscillator tube.

8. A signal generator in accordance with claim 5 including means associated with the cathode circuit of said oscillator for rendering said pulser system ineffective and for connection of said oscillator to an external source of modulating pulses.

9. A signal generator in accordance with claim 4, including shielding means individual with the oscillator circuit, the wavemeter circuit and the attenuator input circuit, respectively, each shielding means forming an integral part of its associated circuit for preventing R. F. radiation loss therefrom, and means constructed and arranged to form a shielding housing enclosing the complete oscillator-attenuator-wavemeter system to provide a R. F. second shield therefor.

10. A high frequency oscillation generator comprising, in combination, a high frequency vacuum tube having cathode, anode and control electrodes, and a pair of tunable oscillatory circuits coupling together certain of said electrodes and comprising a plurality of concentrically disposed hollow cylindrical conductors connected together at one end and arranged to form grid-plate and grid-cathode resonator cavities; a coaxial stub line shorted at one end and capacitively coupled at the open end to said grid-cathode cavity, an attenuator system; said attenuator system including a loop inductively coupled to said coaxial stub line at a location near its shorted end; and a bolometer element connected to said stub line adjacent the shorted end thereof, said bolometer element forming one arm of a balanced four-arm bridge circuit.

11. A high frequency oscillation generator comprising, in combination, a high frequency vacuum tube having cathode, anode and control electrodes, and a pair of tunable oscillatory circuits coupling together certain of said electrodes and comprising a plurality of concentrically disposed hollow cylindrical conductors connected together at one end and arranged to form grid-plate and grid-cathode resonator cavities; a coaxial stub line shorted at one end and capacitively coupled at the other end to said grid-cathode cavity; an adjustable attenuator system including a loop inductively coupled to said coaxial stub line at a location near its shorted end; a bolometer element connected to said stub line adjacent the shorted end thereof, said bolometer element forming one arm of a balanced four-arm bridge circuit, said stub line comprising two cylindrical sections having different lengths, diameters and impedances; and a compensating element connected between the plate and grid cylinders close to said oscillator tube, said compensating element being constructed and arranged to have electrical dimensions and impedances corresponding to those of said stub line for loading the grid-plate cavity whereby proper tracking of the respective tuning elements of said cavities is obtained over the whole frequency band.

12. In combination, an oscillator including a vacuum tube having an anode, a cathode and a plurality of control electrodes and an oscillatory circuit comprising a pair of independently tuned resonant cavities, an adjustable attenuator system, and means coupling said attenuator system to one of said cavities, said coupling means comprising a stub line having one end capacitively coupled to said one of said cavities, means short-circuiting the other end of said line and means coupling said attenuator system to said line adjacent said other end.

13. In combination, a high frequency oscillator comprising a vacuum tube having a cathode, an anode, and a control grid, a pair of concentrically disposed hollow cylindrical conductors connected to form grid-plate and grid-cathode resonance cavities, gang tuning means for synchronously tuning said cavities, a tuneable line having one end connected to one of said cavities at a point of high voltage and the other end thereof connected to a point of relatively low voltage, an attenuator system coupled to said line adjacent said other end, compensating impedance means included in the other of said cavities and means tuning said line to match the impedance of said cavities.

14. In combination, a radio frequency pulse generator including a continuous wave radio frequency oscillator having an electron discharge device provided with a biasing resistor in the cathode circuit thereof, a periodically conducting electron tube having a cathode circuit including said biasing resistor for periodically blocking said device so that radio frequency pulses are produced by said oscillator, and means measuring the radio frequency power of said pulses, the last-named means including radio frequency power measuring means coupled to the output of said oscillator and means operable to disconnect said biasing resistor from the cathode circuit of said tube so that said measuring means produces an indication of radio frequency pulse power as a function of continuous wave radio frequency power.

ANDREW V. HAEFF.
THURE E. HANLEY.
CHARLES B. SMITH.

REFERENCES CITED

The following references are of record in the file of this patent:

UNITED STATES PATENTS

| Number | Name | Date |
|---|---|---|
| 1,901,741 | Fetsch | Mar. 14, 1933 |
| 1,950,410 | Lake | Mar. 13, 1934 |
| 2,098,051 | Lord | Nov. 2, 1937 |
| 2,181,568 | Kotowski | Nov. 28, 1939 |
| 2,204,179 | George | June 11, 1940 |
| 2,235,521 | Higgins | Mar. 18, 19[illegible] |
| 2,255,727 | Allison | Sept. 9, 1941 |
| 2,266,401 | Reeves | Dec. 16, 1941 |
| 2,276,994 | Milinowski | Mar. 17, 1942 |
| 2,277,638 | George | Mar. 24, 1942 |
| 2,295,585 | Lindquist | Sept. 15, 1942 |
| 2,302,369 | George | Nov. 17, 1942 |
| 2,333,688 | Shepard | Nov. 9, 1943 |
| 2,403,289 | Korman | July 2, 1946 |
| 2,404,113 | Wagner | July 16, 1946 |